(12) United States Patent
Wongjuntra et al.

(10) Patent No.: US 9,652,008 B2
(45) Date of Patent: May 16, 2017

(54) POWER MODULE

(71) Applicant: DET International Holding Limited, George Town (KY)

(72) Inventors: Chirawat Wongjuntra, Samutprakarn (TH); Rupesh Tandon, Samutprakarn (TH)

(73) Assignee: DET INTERNATIONAL HOLDING LIMITED, George Town (KY)

( * ) Notice: Subject to any disclaimer, the term of this patent is extended or adjusted under 35 U.S.C. 154(b) by 0 days.

(21) Appl. No.: 14/677,019

(22) Filed: Apr. 2, 2015

(65) Prior Publication Data

US 2016/0295725 A1 Oct. 6, 2016

(51) Int. Cl.
*G06F 1/26* (2006.01)
*G06F 1/18* (2006.01)

(52) U.S. Cl.
CPC ............... *G06F 1/26* (2013.01); *G06F 1/188* (2013.01)

(58) Field of Classification Search
CPC .................................. H05K 7/20; G01B 3/52
See application file for complete search history.

(56) References Cited

U.S. PATENT DOCUMENTS

| 6,091,604 | A * | 7/2000 | Plougsgaard | ......... | H02M 7/003 165/185 |
| 6,421,244 | B1 * | 7/2002 | Shinohara | ............... | H01L 23/24 257/E23.14 |
| 7,209,367 | B2 * | 4/2007 | Nakano | ................ | H05K 3/3405 361/775 |
| 8,107,255 | B2 * | 1/2012 | Sakamoto | .............. | H05K 1/144 361/695 |
| 8,169,784 | B2 * | 5/2012 | Sakamoto | ............. | H01L 25/162 361/729 |
| 8,385,078 | B2 * | 2/2013 | Ibori | ..................... | H02M 7/003 361/742 |
| 2007/0133180 | A1 * | 6/2007 | Nilson | ................... | H05K 7/209 361/720 |
| 2007/0139896 | A1 * | 6/2007 | Yamada | .................. | H01L 23/34 361/720 |

(Continued)

FOREIGN PATENT DOCUMENTS

| CN | 101403938 | 4/2011 |
| TW | 201002182 | 1/2010 |
| TW | 201328513 | 7/2013 |

*Primary Examiner* — Xanthia C Cunningham
(74) *Attorney, Agent, or Firm* — Kirton McConkie; Evan R. Witt (57) ABSTRACT

A power module includes an outer shell, a circuit board, plural electronic components and a power transmission interface. The power transmission interface is electrically connected with the plural electronic components and partially exposed outside the outer shell. The outer shell includes a first lateral plate and a second lateral plate. The second lateral plate includes a first protrusion portion and a second protrusion portion. The first protrusion portion and the second protrusion portion are protruded relative to the first lateral plate and respectively located at two opposite edges of the second lateral plate. After fastening elements are respectively penetrated through a first fixing slot of the first protrusion portion and a second fixing slot of the second protrusion portion and tightened into a case of an electronic device, the power module is fixed and installed on an inner surface of the case.

10 Claims, 7 Drawing Sheets

(56) References Cited

U.S. PATENT DOCUMENTS

| | | | | |
|---|---|---|---|---|
| 2008/0262750 | A1* | 10/2008 | Ibori | H02M 5/451 |
| | | | | 702/34 |
| 2009/0213553 | A1* | 8/2009 | Tschirbs | H01L 23/053 |
| | | | | 361/709 |
| 2010/0025126 | A1* | 2/2010 | Nakatsu | B60L 11/00 |
| | | | | 180/65.1 |
| 2012/0187812 | A1* | 7/2012 | Gerst | E05C 19/06 |
| | | | | 312/237 |

* cited by examiner

POWER MODULE

FIELD OF THE INVENTION

The present invention relates to a power module, and more particularly to a power module without an additional bracket.

BACKGROUND OF THE INVENTION

With increasing development and advance of electronic industries, a variety of electronic devices with different functions are introduced into the market. These electronic devices can meet different requirements and gradually become essential in our daily lives.

For providing a specified function, the electronic device comprises plural electronic components. Generally, the voltages for powering different electronic components are not completely identical. That is, the AC voltage from the current power supply system cannot be directly provided to all of the electronic components. For providing suitable voltages to the electronic components, the electronic device is usually equipped with a power module for converting an input AC voltage into regulated DC voltages. These regulated DC voltages will power the corresponding electronic components.

Take a personal computer as an example. A main board, an optical disk drive or a cooling fan of the computer is powered by a DC voltage lower than 12V. Consequently, a power supply is used for converting a high AC voltage into one or more regulated DC voltages. In other words, the power supply is a main power core for providing electric power to the electricity-receiving components of the electronic device. These electricity-receiving components are electricity connected with the power supply. For example, these components include a main board, an optical disk drive, a floppy disk drive, a hard disk, a cooling fan and so on.

Generally, the power supply is installed on an inner surface of a computer case and provides electric power to other electronic components of the computer. For installing the power supply on an inner surface of the computer case, the power supply is firstly fixed on a bracket, and then the bracket with the power supply is installed on the inner surface of the electronic device.

Figure 1:
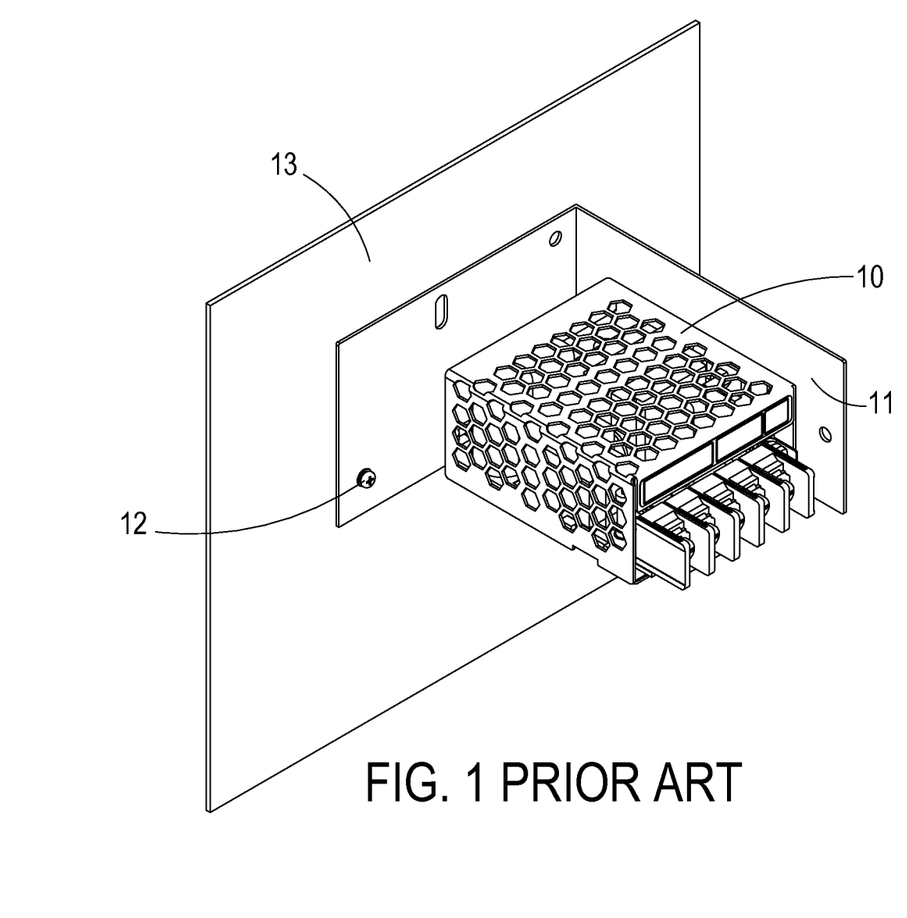
FIG. 1 schematically illustrates a method of installing a power supply on a computer case according to the prior art.

FIG. 1 schematically illustrates a method of installing a power supply on a computer case according to the prior art. Firstly, the power supply 10 is fixed on at least one lateral plate of an L-shaped bracket 11 by screws (not shown). Then, the L-shaped bracket 11 is fixed on an inner surface 13 of the computer case. Consequently, the power supply 10 is installed on the computer case.

However, the use of the L-shaped bracket 11 will increase the installing cost and the installing time and occupy much layout space.

SUMMARY OF THE INVENTION

An object of the present invention provides a power module without an additional bracket. Consequently, the power module can be easily assembled. Moreover, the installing cost, the installing time and the layout space will be reduced.

In accordance with an aspect of the present invention, there is provided a power module. The power module includes an outer shell, a circuit board, plural electronic components and a power transmission interface. The circuit board is disposed within the outer shell. The plural electronic components are disposed on the circuit board. The power transmission interface is electrically connected with the plural electronic components and partially exposed outside the outer shell. The outer shell includes a first lateral plate and a second lateral plate. The second lateral plate includes a first protrusion portion and a second protrusion portion. The first protrusion portion and the second protrusion portion are protruded relative to the first lateral plate and respectively located at two opposite edges of the second lateral plate. The first protrusion portion has a first fixing slot. The second protrusion portion has a second fixing slot. After fastening elements are respectively penetrated through the first fixing slot and the second fixing slot and tightened into a case of an electronic device, the power module is fixed and installed on an inner surface of the case.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
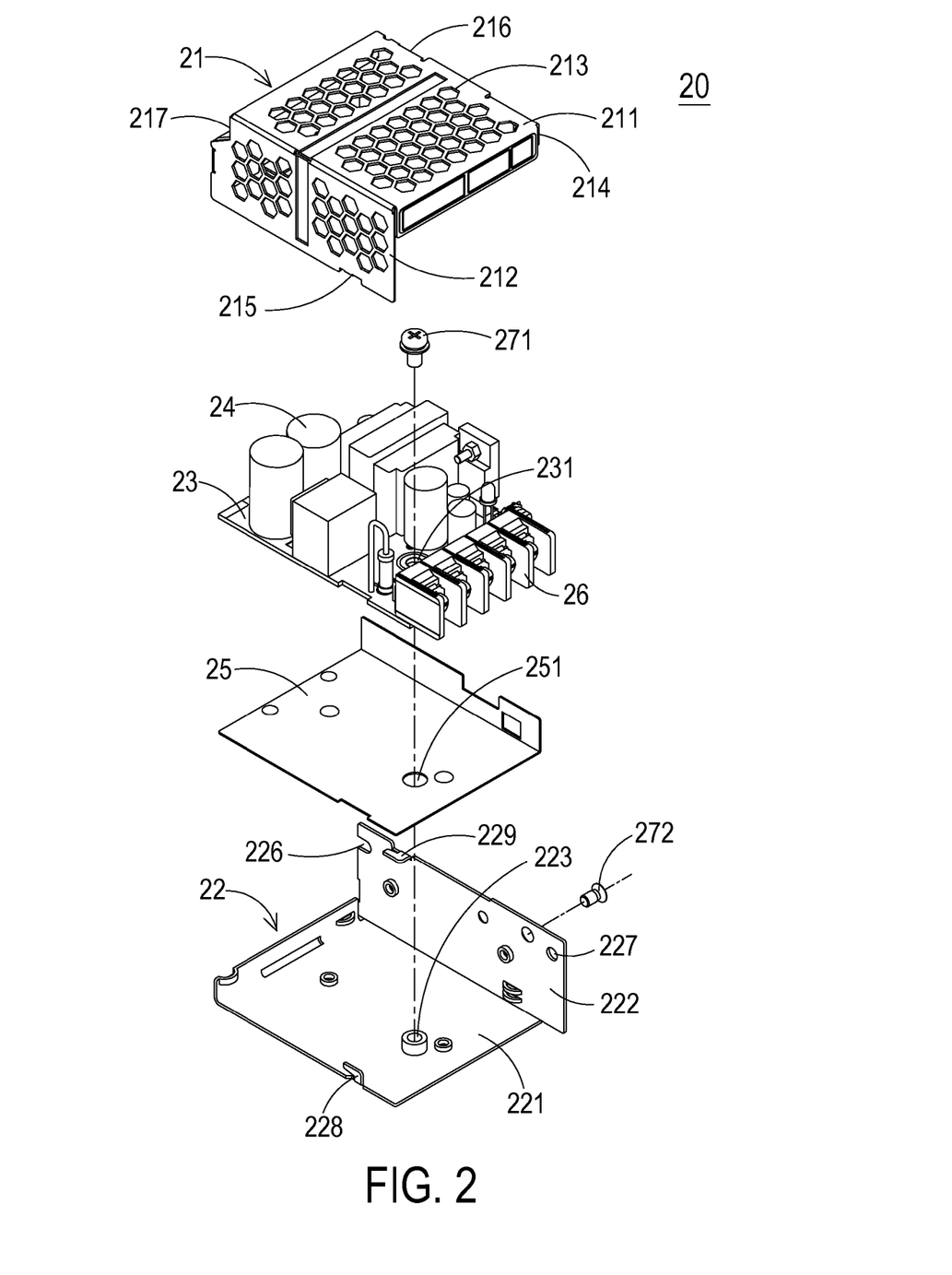
FIG. 2 is a schematic exploded view illustrating a power module according to an embodiment of the present invention.

FIG. 2 is a schematic exploded view illustrating a power module according to an embodiment of the present invention. As shown in FIG. 2, the power module 20 comprises an upper cover 21, a lower cover 22, a circuit board 23, plural electronic components 24, an insulation plate 25 and a power transmission interface 26. The plural electronic components 24 are mounted on the circuit board 23. After the upper cover 21 and the lower cover 22 are combined together, an outer shell of the power module 20 with an accommodation space is defined. The circuit board 23, the plural electronic components 24 and the insulation plate 25 are accommodated within the accommodation space. The insulation plate 25 is used for supporting the circuit board 23. Moreover, a welded surface of the circuit board 23 and the lower cover 22 are isolated from each other by the insulation plate 25. After a fastening element 271 is penetrated through an opening 231 of the circuit board 23 and an opening 251 of the insulation plate 25 and tightened into a fixing hole 223 of the lower cover 22, the circuit board 23, the insulation plate 25 and the lower cover 22 are combined together. Moreover, the upper cover 21 further comprises plural ventilation holes 213. During operations of the electronic components 24, the heat generated by the electronic components 24 may be dissipated to the surroundings through the ventilation holes 213.

In an embodiment, the power module 20 is a power supply. The power module 20 may be installed within a case of the electronic device. An example of the electronic device includes but is not limited to a computer. The power module 20 is used to provide electric power to other components of the electronic device. For example, these components include a main board, an optical disk drive, a floppy disk drive, a hard disk, a cooling fan and so on.

Figure 3:
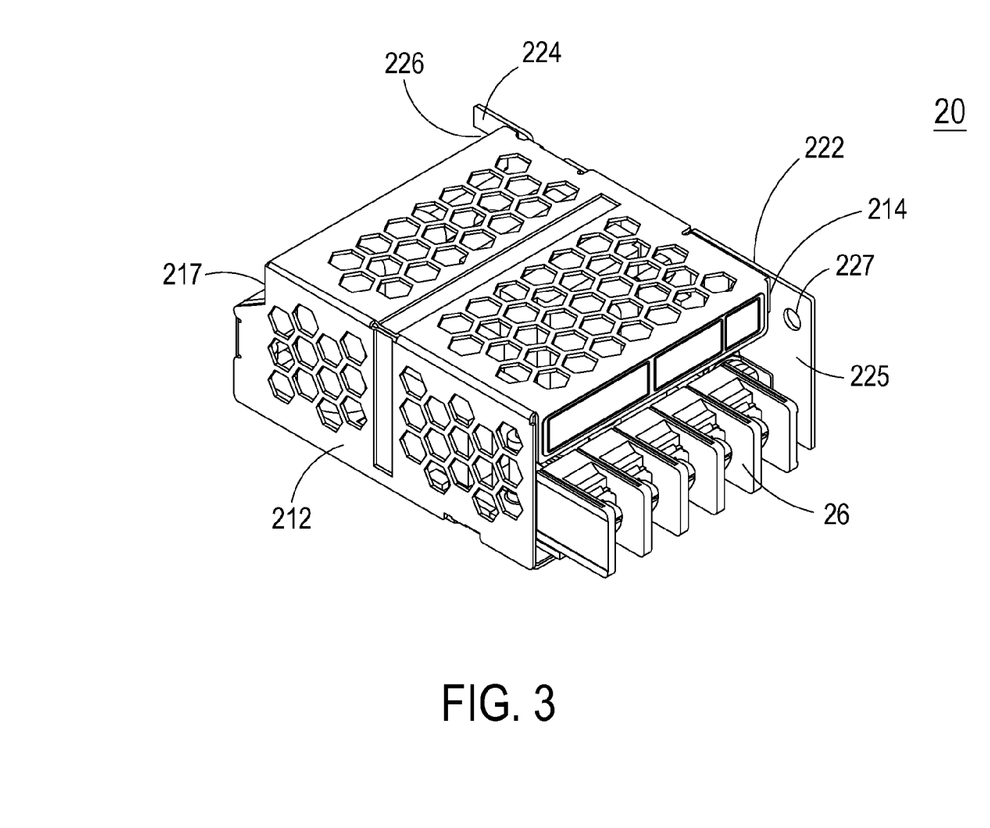
FIG. 3 is a schematic perspective view illustrating the assembled structure of the power module according to the embodiment of the present invention.

FIG. 3 is a schematic perspective view illustrating the assembled structure of the power module according to the embodiment of the present invention. Please refer to FIGS. 2 and 3. After the lower cover 22, the insulation plate 25, the circuit board 23 with plural electronic components 24 and the upper cover 21 are sequentially assembled, the resulting structure of the power module 20 is shown in FIG. 3. The power transmission interface 26 of the power module 20 is disposed on the circuit board 23 and electrically connected with the plural electronic components 24. Moreover, the power transmission interface 26 is exposed outside the combination of the upper cover 21 and the lower cover 22. Consequently, the power transmission interface 26 can provide electric power to other components of the electronic device.

Figure 4:
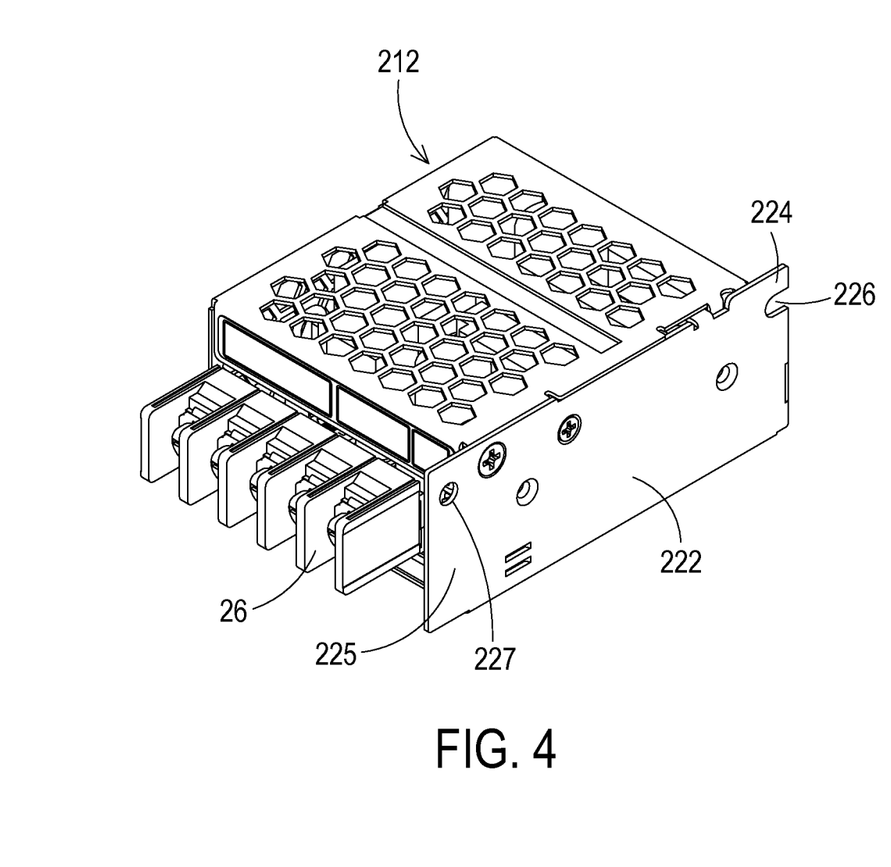
FIG. 4 is a schematic perspective view illustrating the power module according to the embodiment of the present invention and taken along another viewpoint.
Figure 5:
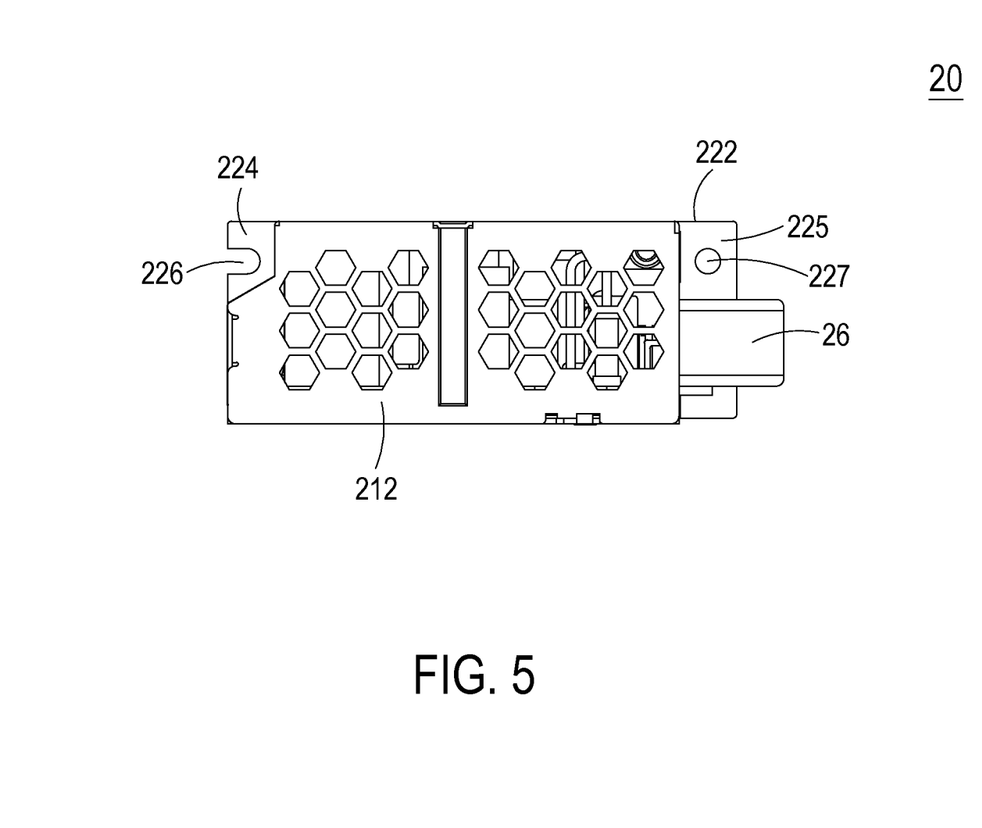
FIG. 5 is a schematic side view illustrating the power module according to the embodiment of the present invention.

FIG. 4 is a schematic perspective view illustrating the power module according to the embodiment of the present invention and taken along another viewpoint. FIG. 5 is a schematic side view illustrating the power module according to the embodiment of the present invention. Please refer to FIGS. 2-5. The upper cover 21 of the power module 20 comprises a top plate 211 and a first lateral plate 212. The lower cover 22 comprises a bottom plate 221 and a second lateral plate 222. The top plate 211 and the bottom plate 221 are opposed to each other. The first lateral plate 212 and the second lateral plate 222 are opposed to each other. The second lateral plate 222 further comprises a first protrusion portion 224 and a second protrusion portion 225, which are protruded relative to the first lateral plate 212. The first protrusion portion 224 and the second protrusion portion 225 are located at two opposite edges of the second lateral plate 222, respectively. The first protrusion portion 224 has a first fixing slot 226. The second protrusion portion 225 is located beside the power transmission interface 26. Moreover, the second protrusion portion 225 has a second fixing slot 227.

Moreover, as shown in FIGS. 2 and 3, the upper cover 21 further comprises an extension plate 214. The extension plate 214 is protruded downwardly from the top plate 211 and perpendicular to the top plate 211. The extension plate 214 is in close with the second lateral plate 222 of the lower cover 22. Via a fastening element 272, the extension plate 214 and the second lateral plate 222 are combined together. Consequently, the upper cover 21 and the lower cover 22 are combined together. Moreover, the bottom plate 221 and the second lateral plate 222 of the lower cover 22 have ear parts 228 and 229, respectively. The first lateral plate 212 and the top plate 211 of the upper cover 21 have locking slots 215 and 216, respectively. Due to the engagement between the ear part 228 and the locking slot 215 and the engagement between the ear part 229 and the locking slot 216, the upper cover 21 and the lower cover 22 are combined together.

Figure 6:
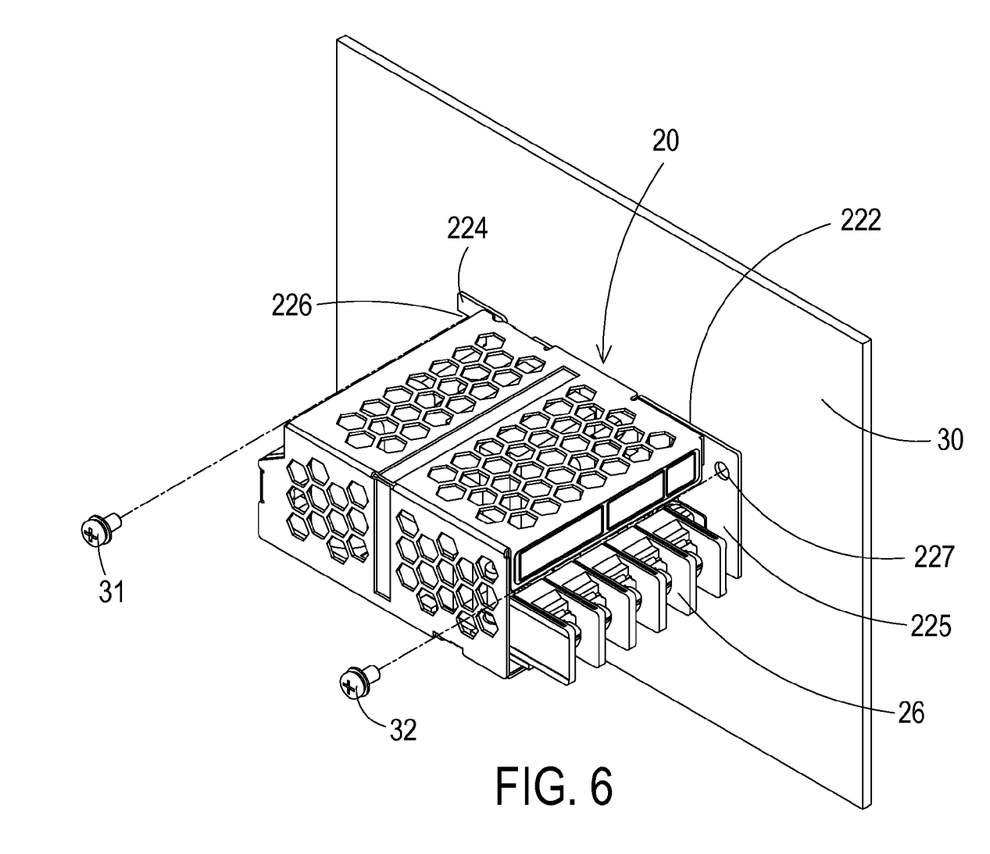
FIG. 6 schematically illustrates the relationship between the power module and an inner surface of an electronic device.
Figure 7:
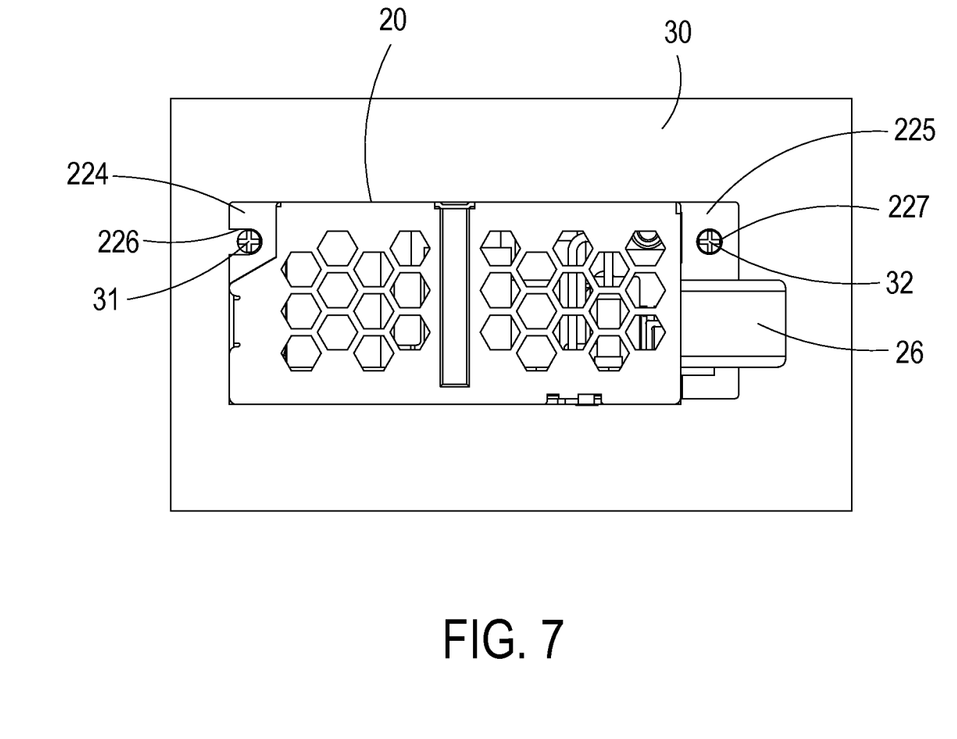
FIG. 7 is a schematic side view illustrating the power module according to the embodiment of the present invention installed on an inner surface of an electronic device.

FIG. 6 schematically illustrates the relationship between the power module and an inner surface of an electronic device. As mentioned above, the first protrusion portion 224 and the second protrusion portion 225 of the second lateral plate 222 have the first fixing slot 226 and the second fixing slot 227, respectively. After fastening elements 31 and 32 are respectively penetrated through the first fixing slot 226 and the second fixing slot 227 and tightened into corresponding fixing holes (not shown) of the case of electronic device, the power module 20 can be installed on an inner surface 30 of the electronic device. The resulting structure of the assembled power module 20 is shown in FIG. 7. Preferably but not exclusively, the fastening elements 31 and 32 are screws.

As mentioned above, the second lateral plate 222 of the lower cover 22 of the power module 20 is directly attached on the inner surface 30 of the electronic device, and the power module 20 is installed on the inner surface 30 of the electronic device by penetrating the fastening elements 31 and 32 through the first fixing slot 226 and the second fixing slot 227. Consequently, it is not necessary to provide the L-shaped bracket or any other additional fixing member to assist in fixing the power module 20. In other words, the assembling cost is reduced. Moreover, since the power module 20 is directly installed on the inner surface 30 of the electronic device, the installing time is saved.

As mentioned above, the second lateral plate 222 further comprises the first protrusion portion 224 and the second protrusion portion 225, which are protruded relative to the first lateral plate 212. Moreover, the first protrusion portion 224 is located at a top end of a first edge of the second lateral plate 222, and the top plate 211 and the first lateral plate 212 of the upper cover 21 have inwardly-concave structures corresponding to the first protrusion portion 224. For example, as shown in FIGS. 2 and 3, a top end of a first edge of the first lateral plate 212 has an inwardly-concave structure 217. Although the first protrusion portion 224 of the second lateral plate 222 is protruded relative to the inwardly-concave structure 217 of the first lateral plate 212, the bottom end of the first edge of the second lateral plate 222 is substantially at the same level with the bottom plate 211. In other words, the arrangement of the first protrusion portion 224 will not increase the overall volume of the power module 20.

The second protrusion portion 225 is located at a second edge of the second lateral plate 222. That is, the second protrusion portion 225 is located at a side close to the power transmission interface 26. Since the power transmission interface 26 is protruded from and exposed outside the outer shell of the power module 20, the second protrusion portion 225 is protruded relative to the first lateral plate 212 but not protruded relative to the power transmission interface 26. Thus, the arrangement of the second protrusion portion 225 will not increase the overall volume of the power module 20.

In other words, the arrangements of the first protrusion portion 224 and the second protrusion portion 225 will not increase the overall volume of the power module 20. Moreover, since the power module 20 is directly installed on the inner surface 30 of the electronic device, the layout space of the power module 20 according to the present invention is reduced when compared with the conventional technology using the L-shaped bracket. Under this circumstance, the utilization of the inner space of the electronic device is enhanced, and the electronic device can be developed toward miniaturization.

From the above descriptions, the present invention provides the power module without an additional bracket. The second lateral plate comprises the first protrusion portion and the second protrusion portion, which are protruded relative to the first lateral plate. The first protrusion portion and the second protrusion portion have the first fixing slot and the second fixing slot, respectively. After the fastening elements are respectively penetrated through the first fixing slot and the second fixing slot and tightened into corresponding fixing holes of the case of electronic device, the power module can be installed on the inner surface of the electronic device. Therefore, the power module can be easily assembled. Moreover, since it is not necessary to provide the bracket or any other additional fixing member to assist in fixing the power module, the assembling cost is reduced, the installing time is saved and the layout space of installing the power module is reduced. Since the utilization of the inner space of the electronic device is enhanced, the electronic device can be developed toward miniaturization.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power module installed on an inner surface of a case of an electronic device, the power module comprising:
    an outer shell;
    a circuit board disposed within the outer shell;
    plural electronic components disposed on the circuit board; and
    a power transmission interface electrically connected with the plural electronic components and partially exposed outside the outer shell,
    wherein the outer shell comprises a first lateral plate and a second lateral plate, wherein the second lateral plate comprises a first protrusion portion and a second protrusion portion, and the first protrusion portion and the second protrusion portion are protruded relative to the first lateral plate and respectively located at two opposite edges of the second lateral plate, wherein the second lateral plate, the first protrusion portion and the second protrusion portion are coplanar and are parallel to the first lateral plate, wherein the first protrusion portion has a first fixing slot, and the second protrusion portion has a second fixing slot, wherein after fastening elements are respectively penetrated through the first fixing slot and the second fixing slot and tightened into the case, the power module is fixed and installed on the inner surface of the case of the electronic device.

2. The power module according to claim 1, wherein the power module is a power supply.

3. The power module according to claim 1, wherein the first protrusion portion is located at a top end of a first edge of the second lateral plate.

4. The power module according to claim 3, wherein a top end of a first edge of the first lateral plate has a concave structure, so that the first protrusion portion of the second lateral plate is protruded relative to the concave structure of the first lateral plate.

5. The power module according to claim 1, wherein the second protrusion portion is located beside the power transmission interface, but the second protrusion portion is not protruded relative to the power transmission interface.

6. The power module according to claim 1, wherein the outer shell comprises an upper cover and a lower cover, wherein the upper cover comprises a top plate and the first lateral plate, and the lower cover comprises a bottom plate and the second lateral plate.

7. The power module according to claim 6, wherein the upper cover further comprises an extension plate, wherein the extension plate is protruded downwardly from the top plate and perpendicular to the top plate, wherein the extension plate is in close with and fixed on the second lateral plate of the lower cover.

8. The power module according to claim 6, wherein the bottom plate of the lower cover has an ear part, and the first lateral plate of the upper cover has a locking slot, wherein the ear part and the locking slot are engaged with each other.

9. The power module according to claim 6, wherein the second lateral plate of the lower cover has an ear part, and the top plate of the upper cover has a locking slot, wherein the ear part and the locking slot are engaged with each other.

10. The power module according to claim 1, wherein the power module further comprises an insulation plate, wherein the circuit board and the outer shell are isolated from each other by the insulation plate.

* * * * *